(12) United States Patent
Endo et al.

(10) Patent No.: US 6,487,944 B2
(45) Date of Patent: Dec. 3, 2002

(54) MACHINE TOOL AND CONTROL METHOD THEREFOR

(75) Inventors: Nobuyuki Endo, Shizuoka (JP); Shigeyuki Kurihara, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 133 days.

(21) Appl. No.: 09/783,086

(22) Filed: Feb. 15, 2001

(65) Prior Publication Data

US 2001/0013267 A1 Aug. 16, 2001

(30) Foreign Application Priority Data

Feb. 16, 2000 (JP) ........................................ 2000-038460

(51) Int. Cl.$^7$ ................................ B23B 1/00; B23B 7/00
(52) U.S. Cl. ........................... 82/1.11; 82/118; 700/151; 700/170
(58) Field of Search ...................... 409/63–78; 700/151, 700/170; 82/118, 117, 133, 129, 1.11, 47

(56) References Cited

U.S. PATENT DOCUMENTS

| | | | | |
|---|---|---|---|---|
| 3,868,845 A | * | 3/1975 | Shimizu | .................... 368/175 |
| 4,176,436 A | * | 12/1979 | McCombs et al. | .......... 173/182 |
| 4,477,754 A | * | 10/1984 | Roch et al. | ................. 700/176 |
| 4,757,313 A | * | 7/1988 | Matsubara et al. | ........ 340/3.43 |
| 4,789,943 A | * | 12/1988 | Yamanaka et al. | ............ 82/118 |

* cited by examiner

Primary Examiner—A. L. Wellington
Assistant Examiner—Dana Ross
(74) Attorney, Agent, or Firm—Morgan, Lewis & Bockius LLP

(57) ABSTRACT

In cutting a high-accuracy thread, a control unit (CPU) uses a first position data calculation program to determine the moving positions of a workpiece and tool every predetermined rotational angle of a spindle rotating motor. The control unit stores the determined moving positions of the workpiece and tool in a first position data table memory, and outputs the determined moving positions as a workpiece position instruction signal and tool position instruction signal to a workpiece feed control circuit and tool feed control circuit every predetermined rotation. In cutting a low-accuracy thread, the control unit uses a second position data calculation program to determine the moving positions of the workpiece and tool every predetermined time interval. The control unit stores the determined moving positions of the workpiece and tool in a second position data table memory, and outputs the determined moving positions as a workpiece position instruction signal and tool position instruction signal to the workpiece feed control circuit and tool feed control circuit every predetermined time interval.

6 Claims, 6 Drawing Sheets

US 6,487,944 B2

MACHINE TOOL AND CONTROL METHOD THEREFOR

BACKGROUND OF THE INVENTION

1. Field of the Invention

The present invention relates to a machine tool for rotating a workpiece about a predetermined axis, and moving at least one of the workpiece and a tool for machining the workpiece, thereby machining the workpiece into a desired shape, and a control method therefor.

2. Related Background Art

As a machine tool of this type, machine tools equipped with numerical controllers have conventionally been known, and include an arrangement suitable for high-speed cutting and an arrangement suitable for high-accuracy machining. A machine tool having an arrangement suitable for high-speed cutting rotates a workpiece at a higher speed than that in high-accuracy machining, and increases the relative moving speed of a tool to machine the workpiece. For this reason, the rotational speed of the workpiece readily varies due to an increase and variations in cutting resistance generated in machining. The machining accuracy of the workpiece tends to decrease owing to deflection of the tool or the like.

On the other hand, a machine tool having an arrangement suitable for high-accuracy machining decreases the rotational speed of a workpiece in contrast to high-speed cutting to suppress the influence of the cutting resistance generated in machining, and synchronizes the rotational speed of the workpiece with the relative moving speed of the tool to strictly position the tool with respect to the workpiece. In the machine tool having an arrangement suitable for high-accuracy machining, an increase in machining efficiency such as the machining speed is limited, and the machining efficiency depends on the performance of a numerical controller.

For example, when a workpiece is to be threaded, the thread must be shaped to advance the screw by one lead by one rotation of the screw, and thread cutting requires high machining accuracy. Generally in a thread cutting machine tool, the rotational speed of a workpiece is set as low as about 1,500 rpm so as to thread the workpiece at high machining accuracy. Note that the screw has a tolerance class such as the first, second, or third class that is determined based on the machining accuracy such as the dimensional tolerance or tolerance.

SUMMARY OF THE INVENTION

Some of screw components including a wood screw do not require high machining accuracy. For example, when wood screws are to be mass-produced, the thread cutting machine tool has an arrangement suitable for high-accuracy machining, as described above, so the machining speed cannot be increased, resulting in low productivity. To increase the productivity, a wood screw may be machined using a machine tool having an arrangement suitable for high-speed cutting. However, the machine tool having an arrangement suitable for high-speed cutting cannot machine screws other than a wood screw that require high machining accuracy.

The present invention has been made in consideration of the above situation, and has as its object to provide a machine tool capable of performing high-speed machining and high-accuracy machining and increasing the productivity, and a control method therefor.

According to the present invention, a machine tool for rotating a workpiece about a predetermined axis, and moving at least one of the workpiece and a tool for machining the workpiece, thereby machining the workpiece into a desired shape is characterized by comprising pulse signal generation means for generating a pulse signal every predetermined rotational angle at the predetermined axis, first moving position determination means for determining a moving position of at least one of the workpiece and the tool every predetermined rotational angle, first movement control means for controlling movement of at least one of the workpiece and the tool in correspondence with the pulse signal generated by the pulse signal generation means so as to set the moving position of at least one of the workpiece and the tool to the moving position determined by the first moving position determination means, divided-timing signal generation means for generating a divided-timing signal every predetermined time interval, second moving position determination means for determining the moving position of at least one of the workpiece and the tool every predetermined time interval, second movement control means for controlling movement of at least one of the workpiece and the tool in correspondence with the divided-timing signal generated by the divided-timing signal generation means so as to set the moving position of at least one of the workpiece and the tool to the moving position determined by the second moving position determination means, and control selection means for selecting one of the first and second movement control means to control movement of at least one of the workpiece and the tool.

In the machine tool according to the present invention, when the control selection means selects control by the first movement control means, the first movement control means controls movement of at least one of the workpiece and tool in correspondence with a pulse signal generated by the pulse signal generation means so as to move at least one of the workpiece and tool to the corresponding moving position determined by the first moving position determination means. Then, the moving position of at least one of the workpiece and tool is controlled in synchronism with rotation of the workpiece about a predetermined axis. As a result, even if the rotational speed of the workpiece about the predetermined axis varies, the workpiece and tool can be strictly positioned with respect to each other, which can realize high-accuracy machining.

In the machine tool according to the present invention, when the control selection means selects control by the second movement control means, the second movement control means controls movement of at least one of the workpiece and tool in correspondence with a divided-timing signal generated by the divided-timing signal generation means so as to move at least one of the workpiece and tool to the corresponding moving position determined by the second moving position determination means. Then, the moving position of at least one of the workpiece and tool is controlled without synchronization with rotation of the workpiece about the predetermined axis. Although high-accuracy machining cannot be achieved, the workpiece can be machined at a machining accuracy corresponding to the rotational speed even when the rotational speed of the workpiece about the predetermined axis is high. In addition, when the control selection means selects control by the second movement control means, the rotational speed of the workpiece about the predetermined axis can be increased to perform high-speed machining and increase the machining efficiency.

From this, the machine tool according to the present invention enables high-speed machining and high-accuracy machining in one machine tool, thus increasing the productivity.

The machine tool according to the present invention may be characterized in that the control selection means selects one of the first and second movement control means on the basis of a predetermined machining condition of the workpiece. Movement of at least one of the workpiece and tool can be optimally controlled under the machining condition of the workpiece.

The machine tool according to the present invention may be characterized in that the predetermined machining condition of the workpiece may include thread machining accuracy in thread cutting. This enables efficient machining complying with the quality required in thread cutting.

The machine tool according to the present invention may be characterized in that the machine tool further comprises counting means for counting the number of times of generation of pulse signals generated by the pulse signal generation means, and the control selection means switches one to the other of the first and second movement control means when the number of times of generation of pulse signals counted by the counting means reaches a predetermined value. Accordingly, the movement control means can be switched even at the intermediate portion of the shape of the workpiece. As a result, even when the workpiece partially includes a portion requiring high machining accuracy, control by the first movement control means can be selected and switched to perform work at high machining accuracy. At a portion other than the portion requiring high machining accuracy, control by the second movement control means can be selected and switched to perform work at high machining efficiency. From this, even in machining a workpiece partially including a portion having a different machining accuracy, the workpiece can be efficiently machined in accordance with the required quality.

According to the present invention, a control method for a machine tool for rotating a workpiece about a predetermined axis, and moving at least one of the workpiece and a tool for machining the workpiece, thereby machining the workpiece into a desired shape, the machine tool including pulse signal generation means for generating a pulse signal every predetermined rotational angle at the predetermined axis, first moving position determination means for determining a moving position of at least one of the workpiece and the tool every predetermined rotational angle, first movement control means for controlling movement of at least one of the workpiece and the tool in correspondence with the pulse signal generated by the pulse signal generation means so as to set the moving position of at least one of the workpiece and the tool to the moving position determined by the first moving position determination means, divided-timing signal generation means for generating a divided-timing signal every predetermined time interval, second moving position determination means for determining the moving position of at least one of the workpiece and the tool every predetermined time interval, and second movement control means for controlling movement of at least one of the workpiece and the tool in correspondence with the divided-timing signal generated by the divided-timing signal generation means so as to set the moving position of at least one of the workpiece and the tool to the moving position determined by the second moving position determination means, is characterized by comprising the steps of: selecting the first movement control means in machining the workpiece at high machining accuracy, and the second movement control means in machining the workpiece at low machining accuracy; and decreasing a rotational speed of the workpiece about the predetermined axis in machining the workpiece at the high machining accuracy, and increasing the rotational speed of the workpiece about the predetermined axis in machining the workpiece at the low machining accuracy in comparison with machining the workpiece at the high machining accuracy.

In the machine tool control method according to the present invention, when the workpiece is machined at high machining accuracy, the rotational speed of the workpiece about a predetermined axis is decreased, and control by the first movement control means is selected. The first movement control means controls movement of at least one of the workpiece and tool in correspondence with a pulse signal generated by the pulse signal generation means so as to move at least one of the workpiece and tool to the corresponding moving position determined by the first moving position determination means. Then, the moving position of at least one of the workpiece and tool is controlled in synchronism with rotation of the workpiece about the predetermined axis. As a result, even if the rotational speed of the workpiece about the predetermined axis varies, the workpiece and tool can be strictly positioned with respect to each other, which can realize high-accuracy machining.

In the machine tool control method according to the present invention, when the workpiece is machined at low machining accuracy, control by the second movement control means is selected. The second movement control means controls movement of at least one of the workpiece and tool in correspondence with a divided-timing signal generated by the divided-timing signal generation means so as to move at least one of the workpiece and tool to the corresponding moving position determined by the second moving position determination means. Then, the moving position of at least one of the workpiece and tool is controlled without synchronization with rotation of the workpiece about the predetermined axis. Although high-accuracy machining cannot be achieved, the workpiece can be machined at a machining accuracy corresponding to the rotational speed. Moreover, when the workpiece is machined at low machining accuracy, the rotational speed of the workpiece about the predetermined axis is higher than that in high-speed machining. High-speed machining can therefore be done to increase the machining efficiency.

From this, the machine tool control method according to the present invention enables high-speed machining and high-accuracy machining in one machine tool, thereby increasing the productivity.

The present invention will be fully understood from the following detailed description taken in conjunction with the accompanying drawings, which are merely examples and do not limit the present invention.

The further application range of the present invention will be apparent from the following detailed description. The detailed description and specific cases will represent a preferred embodiment of the present invention, but are merely examples. Various modifications and improvements within the spirit and scope of the present invention will be apparent to those skilled in the art from the following detailed description.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

A preferred embodiment of a machine tool and its controller according to the present invention will be described in detail below with reference to the accompanying drawings. The embodiment will exemplify thread cutting of threading a bar-like workpiece.

Figure 1:
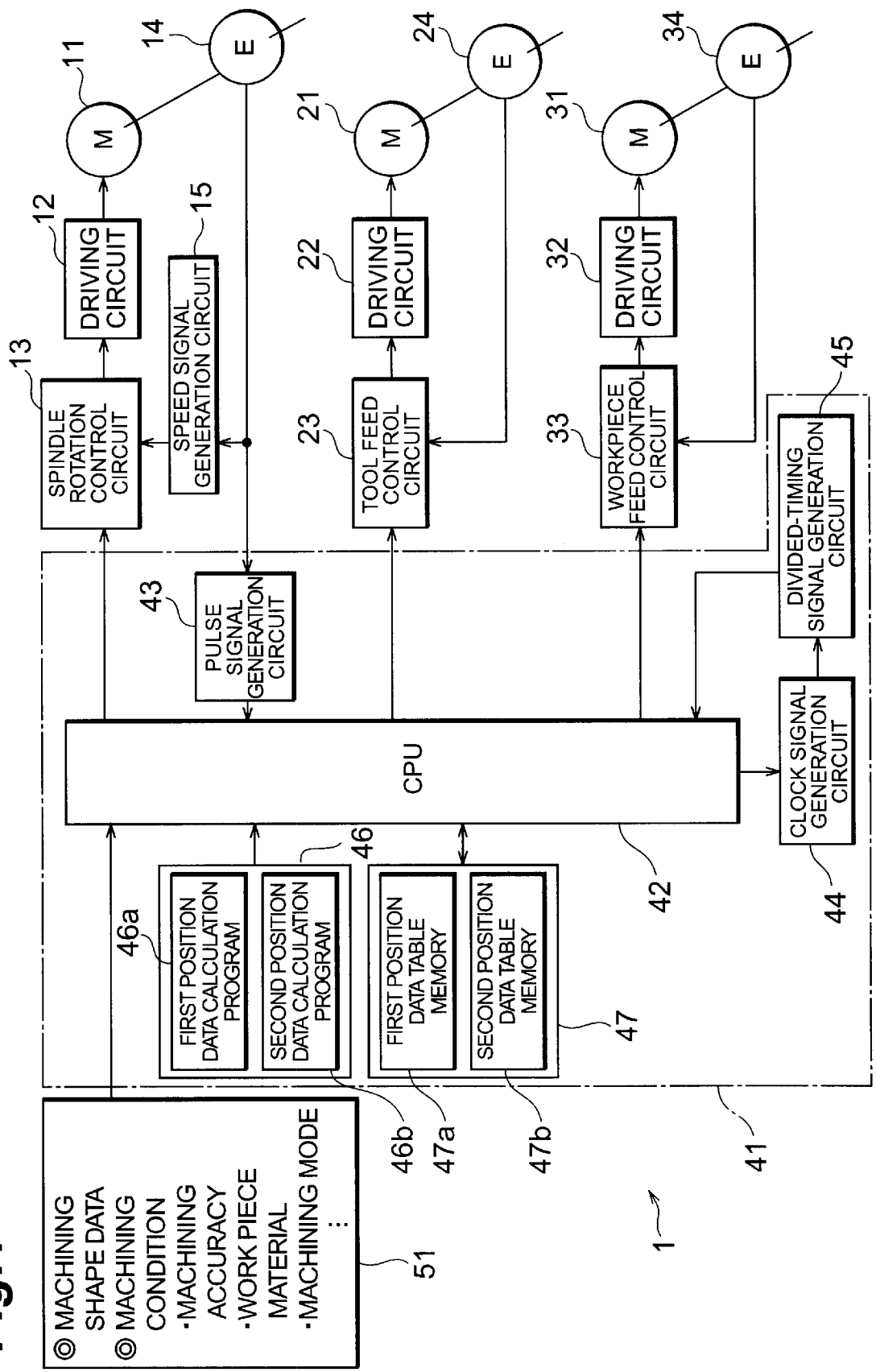
FIG. 1 is a block diagram showing the arrangement of a machine tool according to the present invention.

FIG. 1 is a block diagram showing the arrangement of a machine tool according to the embodiment of the present invention. In FIG. 1, a machine tool 1 comprises a spindle rotating motor 11, tool moving motor 21, workpiece moving motor 31, and control unit 41 for controlling driving of the motors 11, 21, and 31.

The spindle rotating motor 11 rotates a spindle (not shown) capable of holding a workpiece. The spindle rotating motor 11 is connected to the control unit 41 via a driving circuit 12, spindle rotation control circuit 13, and the like. The spindle rotating motor 11 has a pulse encoder 14 for detecting rotation of the spindle rotating motor 11. The output of the pulse encoder 14 is connected to the control unit 41 and a speed signal generation circuit 15. A rotation detection signal output from the pulse encoder 14 is input to the control unit 41 and speed signal generation circuit 15. The pulse encoder 14 generates a rotation detection signal in synchronism with rotation of the spindle rotating motor 11 (spindle), and outputs the rotation detection signal to the control unit 41 and speed signal generation circuit 15.

The speed signal generation circuit 15 converts a rotation detection signal output from the pulse encoder 14 into a spindle rotational speed signal representing the rotational speed of the spindle rotating motor 11 (spindle). The output of the speed signal generation circuit 15 is connected to the spindle rotation control circuit 13. The converted spindle rotational speed signal is input to the spindle rotation control circuit 13.

The spindle rotation control circuit 13 compares a spindle rotational speed instruction signal output from the control unit 41 (to be described later) with the spindle rotational speed signal output from the spindle rotation control circuit 13, and generates a control signal corresponding to the difference. The control signal generated by the spindle rotation control circuit 13 is output to the driving circuit 12.

The driving circuit 12 controls supply power to the spindle rotating motor 11 on the basis of the control signal output from the spindle rotation control circuit 13 so as to set the rotational speed of the spindle rotating motor 11 (spindle) to a spindle rotational speed instruction value (to be described later). The driving circuit 12, spindle rotation control circuit 13, and speed signal generation circuit 15 constitute a feedback control system for the rotational speed of the spindle rotating motor 11 (spindle).

The tool moving motor 21 moves a tool for machining a workpiece, in a direction (X-axis direction) perpendicular to, e.g., the central rotation axis (predetermined axis) of the spindle rotating motor 11 (spindle). The tool moving motor 21 is connected to the control unit 41 via a driving circuit 22 and tool feed control circuit 23. The tool moving motor 21 has a pulse encoder 24 for detecting rotation of the tool moving motor 21. The output of the pulse encoder 24 is connected to the tool feed control circuit 23. A rotation detection signal from the pulse encoder 24 is input to the tool feed control circuit 23. The pulse encoder 24 generates a rotation position signal every predetermined rotational angle of the tool moving motor 21, and outputs the rotation position signal to the tool feed control circuit 23.

The tool feed control circuit 23 recognizes an actual tool moving position on the basis of the rotation position signal output from the pulse encoder 24. The tool feed control circuit 23 compares the recognized actual tool moving position with a tool position instruction signal output from the control unit 41 (to be described later), and generates a tool driving signal based on the comparison result. The tool driving signal generated by the tool feed control circuit 23 is output to the driving circuit 22. The driving circuit 22 controls supply power to the tool moving motor 21 on the basis of the tool driving signal output from the tool feed control circuit 23. The driving circuit 22 and tool feed control circuit 23 constitute a feedback control system for the tool moving position.

The workpiece moving motor 31 moves a workpiece in a direction (Z-axis direction) parallel to, e.g., the central rotation axis of the spindle rotating motor 11 (spindle). The workpiece moving motor 31 is connected to the control unit 41 via a driving circuit 32 and workpiece feed control circuit 33. The workpiece moving motor 31 has a pulse encoder 34 for detecting rotation of the workpiece moving motor 31. The output of the pulse encoder 34 is connected to the workpiece feed control circuit 33. A rotation detection signal from the pulse encoder 34 is input to the workpiece feed control circuit 33. The pulse encoder 34 generates a rotation detection signal every predetermined rotational angle of the workpiece moving motor 31, and outputs the rotation detection signal to the workpiece feed control circuit 33.

The workpiece feed control circuit 33 recognizes an actual workpiece moving position on the basis of the rotation detection signal output from the pulse encoder 34. The workpiece feed control circuit 33 compares the recognized actual workpiece moving position with a workpiece position instruction signal output from the control unit 41 (to be described later), and generates a workpiece driving signal based on the comparison result. The workpiece driving signal generated by the workpiece feed control circuit 33 is output to the driving circuit 32. The driving circuit 32 controls supply power to the workpiece moving motor 31 based on the workpiece driving signal output from the workpiece feed control circuit 33. The driving circuit 32 and workpiece feed control circuit 33 constitute a feedback control system for the workpiece moving position.

Figure 2A:
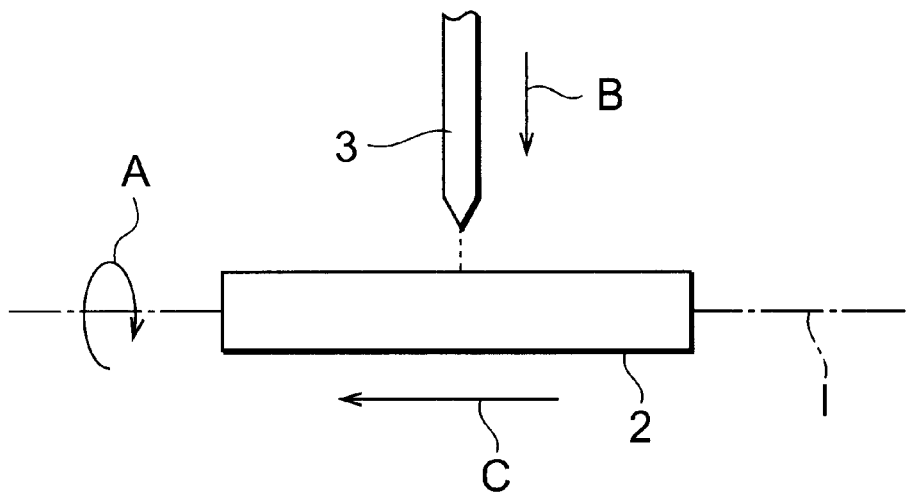
FIG. 2A is a view for explaining an example of machining operation of a workpiece in the machine tool according to the present invention, and showing the shape of the workpiece before machining.
Figure 2B:
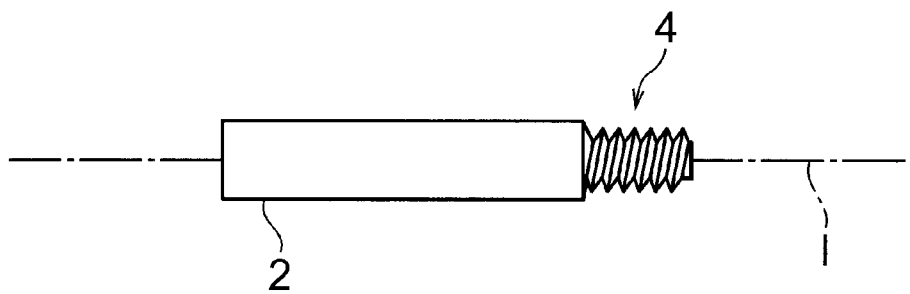
FIG. 2B is a view for explaining an example of machining operation of the workpiece in the machine tool according to the present invention, and showing the shape of the workpiece after machining.

FIG. 2A is a view for explaining an example of machining (cutting) operation of a workpiece 2 in the machine tool 1, and shows the shape of the workpiece 2 before machining. As shown in FIG. 2A, the bar-like workpiece 2 is rotated by the spindle rotating motor 11 about a central rotation axis 1 (direction indicated by the arrow A in FIG. 2A) of the spindle rotating motor 11 (spindle). At the same time, the workpiece 2 is moved by the workpiece moving motor 31 in a direction (direction indicated by the arrow C in FIG. 2A) parallel to the central rotation axis 1 of the spindle rotating motor 11. A tool 3 is moved by the tool moving motor 21 in a direction (direction indicated by the arrow B in FIG. 2A) perpendicular to the central rotation axis 1 of the spindle rotating motor 11, and machines the workpiece 2 into a desired shape. In the embodiment, as shown in FIG. 2B, part of the bar-like workpiece 2 is machined into a threaded portion 4 having, e.g., a major diameter of 2 mm, a pitch of 0.25 mm, and six threads. In FIG. 2A, the direction indicated by the arrow B is the X-axis direction, whereas the direction indicated by the arrow C is the Z-axis direction.

Referring back to FIG. 1, the control unit 41 comprises a CPU (Central Processing Unit) 42, a pulse signal generation circuit 43 as a pulse signal generation means, a clock signal generation circuit 44, a divided-timing signal generation circuit 45 as a divided-timing signal generation means, a ROM 46, a RAM 47, and the like. The CPU 42 is a calculation section for performing entire signal processing of the control unit 41 or the like, and functions as a first moving position determination means, second moving position determination means, first moving control means, second moving control means, control selection means, and counting means.

The pulse signal generation circuit 43 is connected to the pulse encoder 14. A rotation detection signal output from the pulse encoder 14 is input to the pulse signal generation circuit 43 via an interface or the like. The pulse signal generation circuit 43 generates a pulse signal every predetermined rotational angle on the basis of the input rotation detection signal. The pulse signal generation circuit 43 is also connected to the CPU 42. The pulse signal generation circuit 43 outputs the pulse signal generated every predetermined rotational angle to the CPU 42. In the embodiment, the pulse signal generation circuit 43 outputs 4,096 pulse signals at an equal interval in synchronism with the spindle rotating motor 11 (spindle) while the spindle rotating motor 11 (spindle) rotates one revolution.

The clock signal generation circuit 44 receives a predetermined instruction signal output from the CPU 42, and generates and outputs a clock signal of a predetermined period, e.g., 1 msec. The clock signal generated by the clock signal generation circuit 44 is output to the divided-timing signal generation circuit 45. The divided-timing signal generation circuit 45 counts the number of times of generation of clock signals output from the clock signal generation circuit 44. As a result of counting, the divided-timing signal generation circuit 45 generates a divided-timing signal upon the lapse of, e.g., every 4 msec, and outputs it to the CPU 42. That is, the divided-timing signal generation circuit 45 outputs a divided-timing signal having a period of 4 msec to the CPU 42. Note that the periods of the clock and divided-timing signals are not limited to the above-mentioned numerical values, and can be properly set in consideration of the performance of the CPU 42, the resolutions of the pulse encoders 24 and 34, the performance of the motors 11, 21, and 31, and the like.

The ROM 46 is a memory section storing various processing programs, and part of the ROM 46 stores first and second position data calculation programs 46a and 46b. The first position data calculation program 46a is a calculation program for determining the moving positions of the workpiece 2 and tool 3 every predetermined rotational angle (360/4,096° in the embodiment) of the spindle rotating motor 11 (spindle) in thread cutting. The second position data calculation program 46b is a calculation program for determining the moving positions of the workpiece 2 and tool 3 every predetermined time interval (4 msec in the embodiment) in thread cutting.

The RAM 47 readably temporarily stores the results of various calculations in the CPU 42, and part of the RAM 47 comprises first and second position data table memories 47a and 47b. The first position data table memory 47a stores, as position data of the workpiece 2 and tool 3, the moving positions of the workpiece 2 and tool 3 every 360/4,096° of the rotational angle of the spindle rotating motor 11 (spindle) that are determined using the first position data calculation program 46a. The second position data table memory 47b stores, as position data of the workpiece 2 and tool 3, the moving positions of the workpiece 2 and tool 3 every 4 msec that are determined using the second position data calculation program 46b.

As shown in FIG. 1, a data input section 51 is used to input various data about machining of the workpiece 2, such as machining shape data and machining conditions. Data input to the data input section 51 is sent to the CPU 42. As machining conditions, the data input section 51 can input data about the accuracy, the material of the workpiece 2, the machining mode such as thread cutting, and the like. For thread cutting, the tolerance class (first to third classes) may be input as accuracy data, or numerical values such as the dimensional tolerance and tolerance may be input. In the embodiment, the tolerance class (first to third classes) is input.

The CPU 42 counts the number of times of generation of pulse signals output from the pulse signal generation circuit 43 on the basis of a program stored in the ROM 46, and calculates the cumulative number of revolutions of the spindle rotating motor 11 (spindle) on the basis of the counting result.

Figure 3:
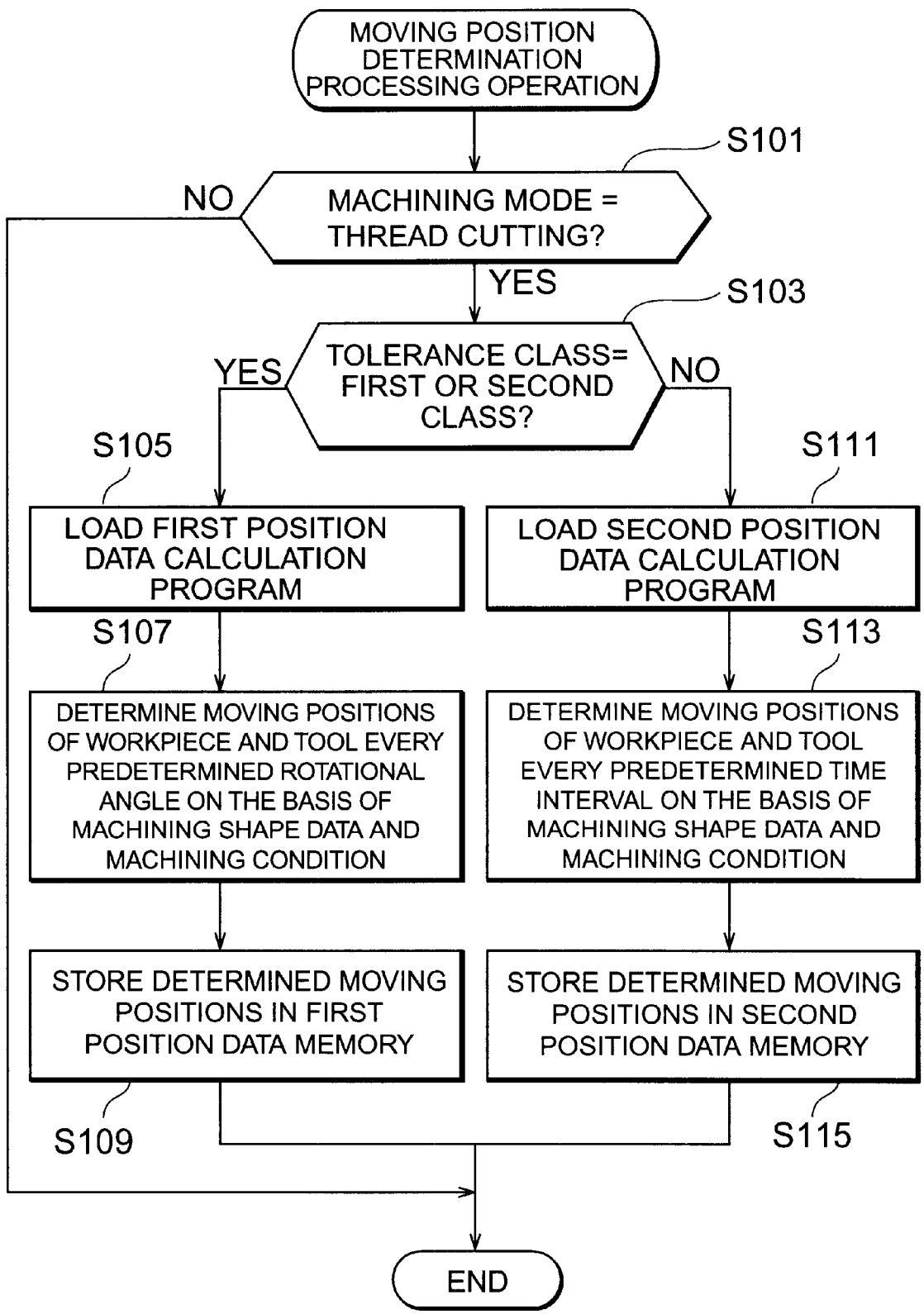
FIG. 3 is a flow chart for explaining determination processing operation of the moving positions of a workpiece and tool in the machine tool according to the present invention.

Processing operation of determining the moving positions of the tool 3 and workpiece 2 in the CPU 42 (control unit 41) will be explained with reference to FIG. 3.

The CPU 42 loads data input to the data input section 51, and checks in S101 whether the input machining mode is thread cutting. If the input machining mode is thread cutting ("YES" in S101), the CPU 42 advances to S103. If the input machining mode is not thread cutting ("N" in S101), the CPU 42 ends processing operation, reads out a program corresponding to the input machining mode from the ROM 46, and executes control. In S103, the CPU 42 checks whether an input tolerance class is the first or second class.

If the input tolerance class is the first or second class ("YES" in S103), the CPU 42 shifts to S105; or if the input tolerance class is not the first or second class, i.e., the input tolerance class is the third class ("NO" in S103), to S111.

In S105, the CPU 42 loads the first position data calculation program 46a from the ROM 46. In S107, the CPU 42 uses the first position data calculation program 46a loaded from the ROM 46 to determine the moving positions of the workpiece 2 and tool 3 every predetermined rotational angle (every 360/4,096°) of the spindle rotating motor 11 (spindle) after the start of machining on the basis of data such as machining shape data and machining conditions input to the data input section 51. After the moving positions of the workpiece 2 and tool 3 are determined, the CPU 42 shifts to S109, and stores the moving positions of the workpiece 2 and tool 3 every 360/4,096° of the rotational angle of the spindle rotating motor 11 (spindle), as position data of the workpiece 2 and tool 3 in the first position data table memory 47a of the RAM 47. Then, the CPU 42 ends processing operation.

In S111, the CPU 42 loads the second position data calculation program 46b from the ROM 46. In S113, the CPU 42 uses the second position data calculation program 46b loaded from the ROM 46 to determine the moving positions of the workpiece 2 and tool 3 every predetermined time interval (every 4 msec) after the start of machining on the basis of data such as machining shape data and machining conditions input to the data input section 51. After the moving positions of the workpiece 2 and tool 3 are determined, the CPU 42 shifts to S115, and stores the moving positions of the workpiece 2 and tool 3 every 4 msec as position data of the workpiece 2 and tool 3 in the second position data table memory 47b of the RAM 47. Then, the CPU 42 ends processing operation.

Figure 4:
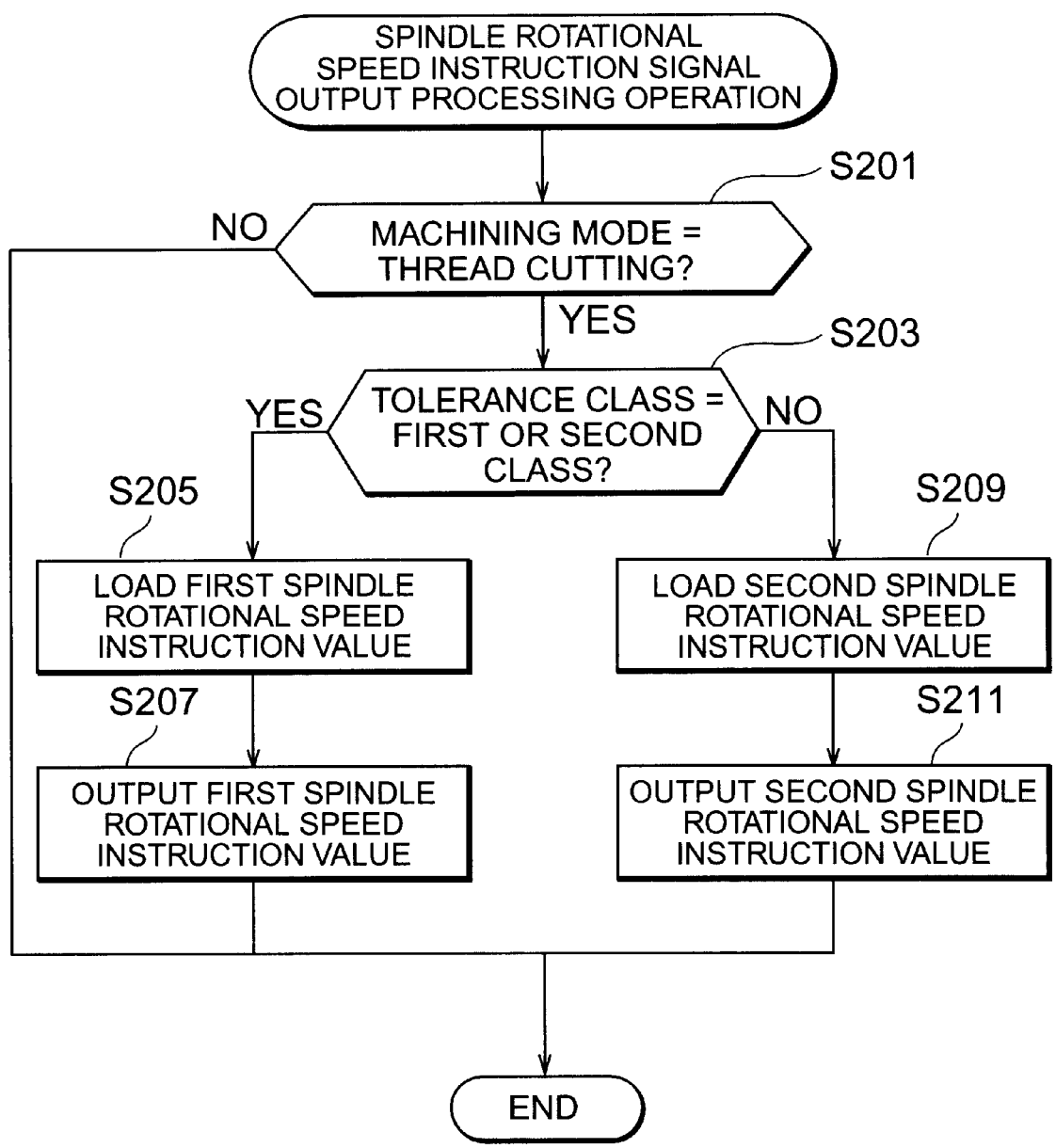
FIG. 4 is a flow chart for explaining output processing operation of a spindle rotational speed instruction signal in the machine tool according to the present invention.

Output processing operation of a spindle rotational speed instruction signal in the CPU 42 (control unit 41) will be explained with reference to FIG. 4.

In S201, the CPU 42 checks whether the input machining mode is thread cutting. If the input machining mode is thread cutting ("YES" in S201), the CPU 42 advances to S203. If the input machining mode is not thread cutting ("NO" in S201), the CPU 42 ends processing operation, reads out a program corresponding to the input machining mode from the ROM 46, and determines a spindle rotational speed instruction value suitable for the input machining mode. In S203, the CPU 42 checks whether an input tolerance class is the first or second class. If the input tolerance class is the first or second class ("YES" in S203), the CPU 42 shifts to S205; or if the input tolerance class is not the first or second class, i.e., the input tolerance class is the third class ("NO" in S203), to S209.

In S205, the CPU 42 loads a first spindle rotational speed instruction value stored in the ROM 46. In the embodiment, the first spindle rotational speed instruction value is set to, e.g., 1,500 rpm and stored in the ROM 46. In S207, the CPU 42 outputs the first spindle rotational speed instruction value read out from the ROM 46 as a first spindle rotational speed instruction signal to the spindle rotation control circuit 13, and ends processing operation. The spindle rotation control circuit 13 outputs a control signal to the driving circuit 12 so as to set the rotational speed of the spindle rotating motor 11 (spindle) to 1,500 rpm on the basis of the first spindle rotational speed instruction signal output from the CPU 42. Note that the first spindle rotational speed instruction value is not limited to 1,500 rpm, and can be determined by the resolution of the pulse encoder 14, the performance of the CPU 42, and the like as far as the CPU 42 can control the moving positions of the workpiece 2 and tool 3 based on a rotation detection signal from the pulse encoder 14.

In S209, the CPU 42 loads a second spindle rotational speed instruction value stored in the ROM 46. In the embodiment, the second spindle rotational speed instruction value is set to a higher rotational speed than the first spindle rotational speed instruction value, e.g., 4,000 rpm, and stored in the ROM 46. In S211, the CPU 42 outputs the second spindle rotational speed instruction value read out from the ROM 46 as a second spindle rotational speed instruction signal to the spindle rotation control circuit 13, and ends processing operation. The spindle rotation control circuit 13 outputs a control signal to the driving circuit 12 so as to set the rotational speed of the spindle rotating motor 11 (spindle) to 4,000 rpm on the basis of the second spindle rotational speed instruction signal output from the CPU 42. Note that the second spindle rotational speed instruction value is not limited to 4,000 rpm, and can be set higher than 4,000 rpm.

Figure 5:
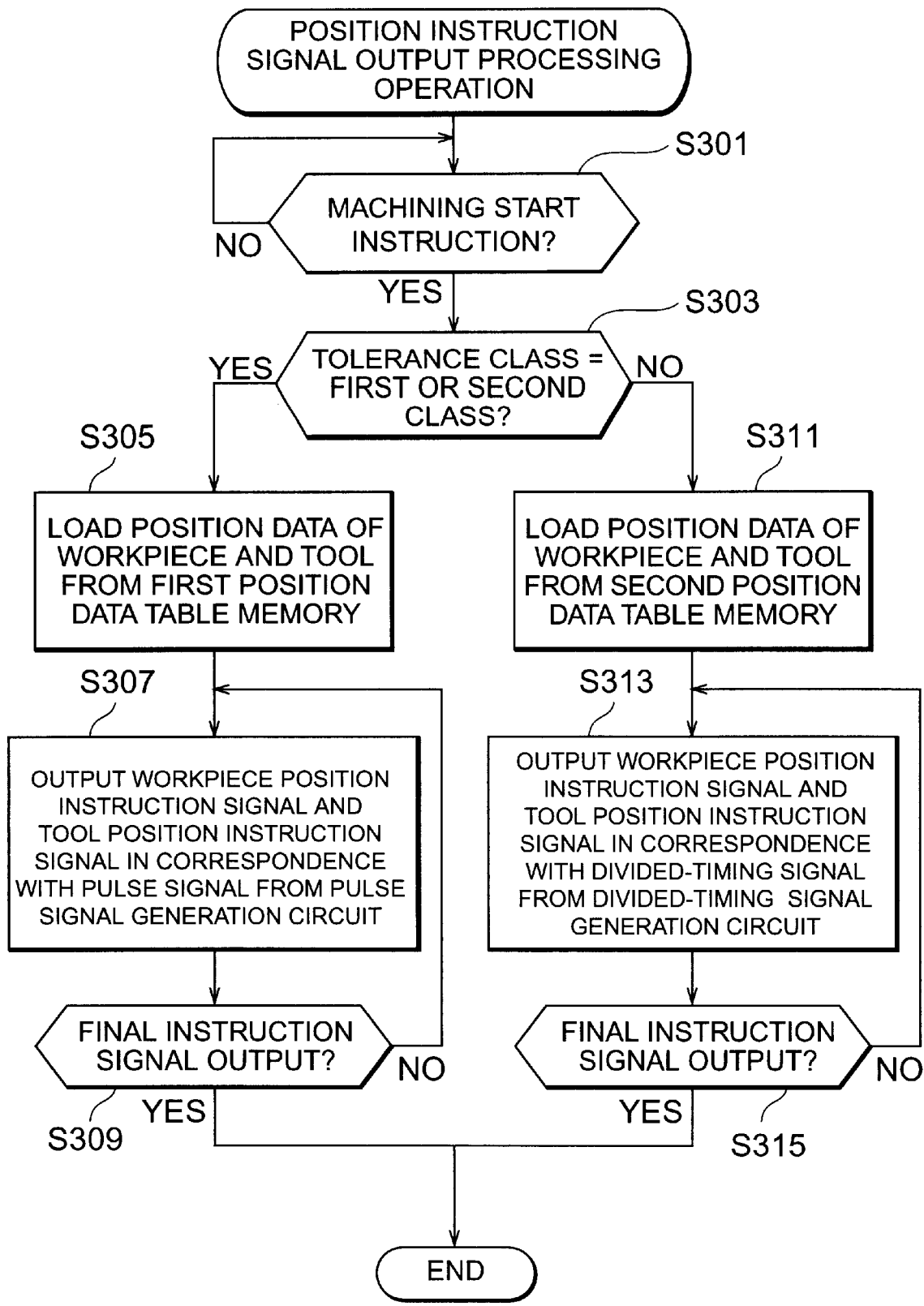
FIG. 5 is a flow chart for explaining output processing operation of a tool position instruction signal and workpiece position instruction signal in the machine tool according to the present invention.

Output processing operation of a tool position instruction signal and workpiece position instruction signal in the CPU 42 (control unit 41) will be explained with reference to FIG. 5.

In S301, the CPU 42 checks whether a thread cutting start instruction has been output, a description of which will be omitted. If the machining (cutting) start instruction has been output ("YES" in S301), the CPU 42 shifts to S303; or if the machining start instruction has not been output ("NO" in S301), the CPU 42 returns and waits until a machining start instruction is output. In S303, the CPU 42 checks whether an input tolerance class is the first or second class. If the input tolerance class is the first or second class ("YES" in S303), the CPU 42 shifts to S305; or if the input tolerance class is not the first or second class, i.e., the input tolerance class is the third class ("NO" in S303), to S311.

In S305, the CPU 42 loads position data of the workpiece 2 and tool 3 stored in the first position data table memory 47a of the RAM 47. After the position data of the workpiece 2 and tool 3 are loaded, the CPU 42 advances to S307, and outputs the position data of the workpiece 2 which represents the moving position of the workpiece 2, as a workpiece position instruction signal to the workpiece feed control circuit 33. Further, the CPU 42 outputs the position data of the tool 3 which represents the moving position of the tool 3, as a tool position instruction signal to the tool feed control circuit 23. The workpiece position instruction signal and tool position instruction signal are output in correspondence with a pulse signal output from the pulse signal generation circuit 43. More specifically, every time the spindle rotating motor 11 (spindle) rotates through 360/4,096°, a workpiece position instruction signal and tool position instruction signal are output on the basis of a pulse signal output from the pulse signal generation circuit 43 in synchronism with rotation of the spindle rotating motor 11 (spindle).

In S309, the CPU 42 checks whether a workpiece position instruction signal and tool position instruction signal corresponding to the final position data among position data of the workpiece 2 and tool 3 loaded in S305 have been output. If the workpiece position instruction signal and tool position instruction signal corresponding to the final moving positions have not been output ("NO" in S309), the CPU 42 returns to S307, and sequentially outputs workpiece position instruction signals and tool position instruction signals every time the rotational angle of the spindle rotating motor 11 (spindle) reaches 360/4,096°. Then, the tool 3 moves a plurality of number of times within the section where the threaded portion 4 of the workpiece 2 is to be formed. As a result, the threaded portion 4 is formed. If the workpiece position instruction signal and tool position instruction signal corresponding to the final moving positions have been output ("YES" in S309), the CPU 42 ends processing operation.

In S311, the CPU 42 loads position data of the workpiece 2 and tool 3 stored in the second position data table memory 47b of the RAM 47. After the position data of the workpiece 2 and tool 3 are loaded, the CPU 42 shifts to S313, and outputs the position data of the workpiece 2 which represents the moving position of the workpiece 2, as a workpiece position instruction signal to the workpiece feed control circuit 33. In addition, the CPU 42 outputs the position data of the tool 3 which represents the moving position of the tool 3, as a tool position instruction signal to the tool feed control circuit 23. The workpiece position instruction signal and tool position instruction signal are output in correspondence with a divided-timing signal output from the divided-timing signal generation circuit 45. More specifically, every time 4 msec has elapsed after the start of machining, a workpiece position instruction signal and tool position instruction signal are output on the basis of a timing-divided signal output from the divided-timing signal generation circuit 45 without synchronization with rotation of the spindle rotating motor 11 (spindle).

In S315, the CPU 42 checks whether a workpiece position instruction signal and tool position instruction signal corresponding to the final position data among position data of the workpiece 2 and tool 3 loaded in S311 have been output. If the workpiece position instruction signal and tool position instruction signal corresponding to the final moving positions have not been output ("NO" in S315), the CPU 42 returns to S313, and sequentially outputs workpiece position instruction signals and tool position instruction signals upon lapse of every 4 msec. Then, the tool 3 moves a plurality of number of times within the section where the threaded portion 4 of the workpiece 2 is to be formed. As a result, the threaded portion 4 is formed. If the workpiece position instruction signal and tool position instruction signal corresponding to the final position data have been output ("YES" in S315), the CPU 42 ends processing operation.

Machining operation in threading the workpiece 2 using the machine tool 1 having the above-described arrangement will be described.

When the user inputs machining shape data, machining conditions, and the like through the data input section so as to machine part of the workpiece 2 into the threaded portion 4 having a major diameter of 2 mm, a pitch of 0.25 mm, six threads, and the first tolerance class, the control unit 41 (CPU 42) uses the first position data calculation program 46a to determine the moving positions of the workpiece 2 and tool 3 every 360/4,096° of the rotational angle of the spindle rotating motor 11 (spindle) after the start of machining. The control unit 41 (CPU 42) stores the determined moving positions of the workpiece 2 and tool 3 as position data of the workpiece 2 and tool 3 in the first position data table memory 47a. The control unit 41 (CPU 42) controls the spindle rotating motor 11 (spindle) so as to set the rotational speed of the spindle rotating motor 11 (spindle) to 1,500 rpm.

After a machining start instruction is output, the control unit 41 (CPU 42) loads the position data of the workpiece 2 and tool 3 stored in the first position data table memory 47a. Every time the spindle rotating motor 11 (spindle) rotates through 360/4,096°, the control unit 41 (CPU 42) outputs the position data as a workpiece position instruction signal and tool position instruction signal to the workpiece feed control circuit 33 and tool feed control circuit 23 respectively in synchronism with rotation of the spindle rotating motor 11 (spindle), and controls the relative position of the tool 3 to the workpiece 2 so as to change at, e.g., a uniform rate. Then, the tool 3 moves a plurality of number of times within the section where the threaded portion 4 of the workpiece 2 is to be formed, and thread cutting is completed.

Figure 6:
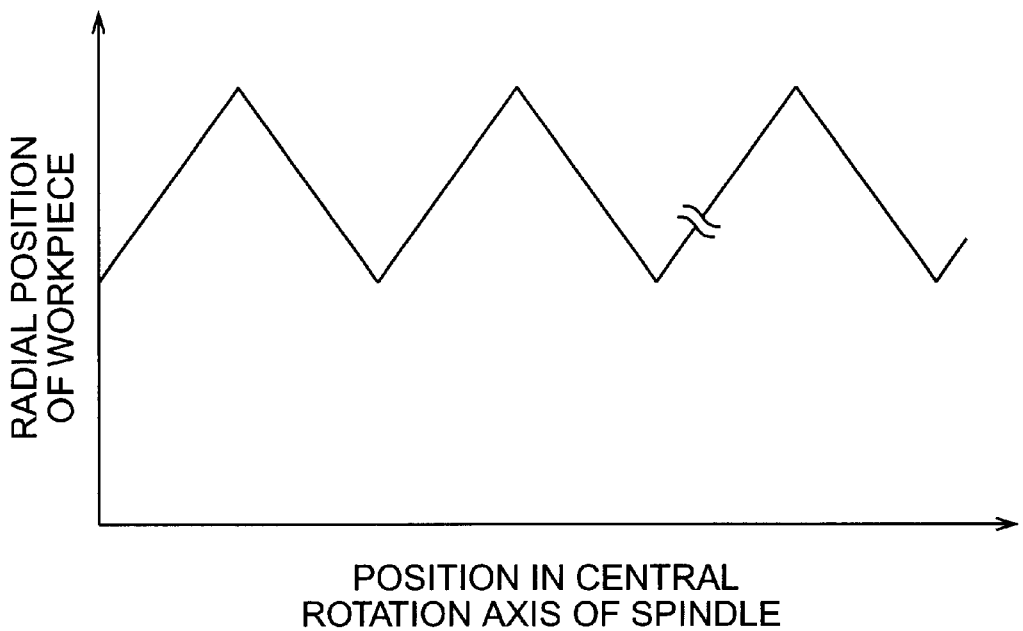
FIG. 6 is a graph showing the machining locus of a workpiece in the machine tool according to the present invention.

As described above, the control unit 41 (CPU 42) determines the moving positions of the workpiece 2 and tool 3 using the first position data calculation program 46a, and controls the moving positions of the workpiece 2 and tool 3 in correspondence with a pulse signal output from the pulse signal generation circuit 43 so as to move the workpiece 2 and tool 3 to the determined moving positions. Hence, rotation of the spindle rotating motor 11 (spindle) is synchronized with relative movement of the tool 3 to the workpiece 2. For this reason, relative movement of the tool 3 proceeds in synchronism with rotation of the spindle rotating motor 11 (spindle) regardless of variations in the rotational speed of the spindle rotating motor 11 (spindle) caused by the difference between the initial cutting load at the start position of thread cutting of the workpiece 2 and a subsequent cutting load generated up to the end position of thread cutting of the workpiece 2, or variations in the rotational speed of the spindle rotating motor 11 (spindle), i.e., workpiece 2 caused by composite factors including the difference in the rotation delay amount of the spindle rotating motor 11 (spindle) owing to the difference in cutting amount in a plurality of relative movement operations (rough cutting is done at a large cutting amount for the first time, and finishing cutting is done at a small cutting amount at last). Resultantly, the workpiece 2 is machined into a shape representing a machining locus shown in FIG. 6 without any errors in major diameter, pitch, or the like, and the threaded portion 4 can be machined at high accuracy. FIG. 6 is a graph showing the machining locus of the workpiece 2.

When the user inputs machining shape data, machining conditions, and the like through the data input section so as to machine part of the workpiece 2 into the threaded portion 4 having a major diameter of 2 mm, a pitch of 0.25 mm, six threads, and the third tolerance class, the control unit 41 (CPU 42) uses the second position data calculation program 46b to determine the moving positions of the workpiece 2 and tool 3 every 4 msec after the start of machining. The control unit 41 (CPU 42) stores the determined moving positions of the workpiece 2 and tool 3 as position data of the workpiece 2 and tool 3 in the second position data table memory 47b. The control unit 41 (CPU 42) controls the spindle rotating motor 11 (spindle) so as to set the rotational speed of the spindle rotating motor 11 (spindle) to 4,000 rpm.

After a machining start instruction is output, the control unit 41 (CPU 42) loads the position data of the workpiece 2 and tool 3 stored in the second position data table memory 47b. The control unit 41 (CPU 42) outputs a workpiece position instruction signal and tool position instruction signal to the workpiece feed control circuit 33 and tool feed control circuit 23 respectively upon lapse of every 4 msec, and controls the relative position of the tool 3 to the workpiece 2 so as to change at, e.g., a uniform rate. Then, the tool 3 moves a plurality of number of times within the section where the threaded portion 4 of the workpiece 2 is to be formed, and thread cutting is completed.

As described above, the control unit 41 (CPU 42) determines the moving positions of the workpiece 2 and tool 3 using the second position data calculation program 46b, and controls the moving positions of the workpiece 2 and tool 3 in correspondence with a divided-timing signal output from the divided-timing signal generation circuit 45 so as to move the workpiece 2 and tool 3 to the determined moving positions. Thus, machining is executed while rotation of the spindle rotating motor 11 (spindle) and relative movement of the tool 3 to the workpiece 2 are not synchronized with each other.

Figure 7:
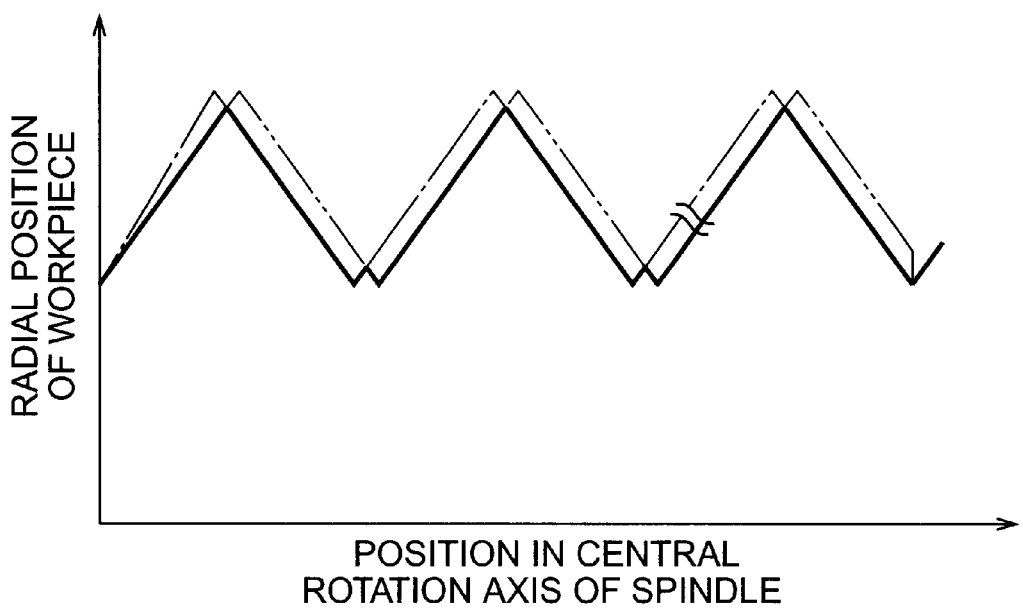
FIG. 7 is a graph showing the machining locus of a workpiece in the machine tool according to the present invention.

For this reason, relative movement of the tool 3 proceeds without synchronization with rotation of the spindle rotating motor 11 (spindle) regardless of variations in the rotational speed of the spindle rotating motor 11 (spindle), i.e., workpiece 2 caused by the above-described composite factors. As a result, the workpiece 2 is machined into a shape representing a machining locus shown in FIG. 7, i.e., a shape representing a machining locus (machining locus indicated by the solid line in FIG. 7) as a synthesis of the first machining locus indicated by the chain double-dashed line and the final machining locus indicated by the chain line. The threaded portion 4 is machined at low accuracy with errors in major diameter, pitch, or the like. However, the rotational speed of the spindle rotating motor 11 (spindle) is 4,000 rpm, so that the threaded portion 4 can be machined at a high speed, which increases the machining efficiency. FIG. 7 is a graph showing the machining locus of the workpiece 2, similar to FIG. 6.

According to the embodiment, the machine tool 1 selects the rotational speed value of the spindle rotating motor 11 (spindle) and the contents of movement control of the workpiece 2 and tool 3 in accordance with the tolerance class, i.e., machining accuracy in machining the workpiece 2 into the threaded portion 4. One machine tool 1 enables high-speed machining and high-accuracy machining to increase the productivity.

Although the embodiment has exemplified that the entire threaded portion 4 is machined at the same machining accuracy (tolerance class), the machine tool 1 can also machine the workpiece 2 such that the threaded portion 4 includes a portion having a different machining accuracy (tolerance class). In this case, a position of the workpiece 2 having a different machining accuracy (tolerance class) (e.g., position where the tolerance class changes from the first class to the third class) is set as the cumulative number of revolutions of the spindle rotating motor 11 (spindle). The CPU 42 determines that the cumulative number of revolutions has reached the set value, and switches the rotational speed value of the spindle rotating motor 11 (spindle) and the contents of movement control of the workpiece 2 and tool 3.

In the embodiment, the CPU 42 may perform calculation of determining the moving positions of the workpiece 2 and tool 3 in correspondence with input of a pulse signal or divided-timing signal, and output the determined moving positions of the workpiece 2 and tool 3 as a workpiece position instruction signal and tool position instruction signal.

In the embodiment, a program may be created to make the CPU 42 function as the clock signal generation circuit 44 and divided-timing signal generation circuit 45, and stored in the ROM 46. To the contrary, some of the functions of the CPU 42 may be realized by a hardware circuit.

In the embodiment, an user-operable operation section may be adopted, and operated to select between control of determining the moving positions of the workpiece 2 and tool 3 every predetermined rotational angle of the spindle rotating motor 11 (spindle), and outputting the determined moving positions of the workpiece 2 and tool 3 as a workpiece position instruction signal and tool position instruction signal in correspondence with a pulse signal, and control of determining the moving positions of the workpiece 2 and tool 3 every predetermined time interval, and outputting the determined moving positions of the workpiece 2 and tool 3 as a workpiece position instruction signal and tool position instruction signal in correspondence with a divided-timing signal.

In the embodiment, it is also possible that only the workpiece 2 is set movable, and the CPU 42 (control unit 41) determines the moving position of the workpiece 2. Alternatively, it is possible that only the tool 3 is set movable, and the CPU 42 (control unit 41) determines the moving position of the tool 3.

In the embodiment, one value may be set as the rotational speed value of the spindle rotating motor 11 (spindle).

In the embodiment, it is also possible that a spindle rotational speed instruction value is input through the data input section 51, and the CPU 42 (control unit 41) controls the rotational speed of the spindle rotating motor 11 (spindle) on the basis of the input spindle rotational speed instruction value.

The present invention can be applied to various types of thread cutting such as internal thread cutting, external thread cutting, single thread cutting, and multiple thread cutting, and can also be applied to various works such as boring other than thread cutting.

It is apparent from the above description of the present invention that the present invention can be variously modified. These modifications cannot be recognized to depart from the spirit and scope of the present invention, and improvements apparent to those skilled in the art fall within the appended claims.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A machine tool for rotating a workpiece about a predetermined axis, and moving at least one of the workpiece and a tool for machining the workpiece, thereby machining the workpiece into a desired shape, comprising:

pulse signal generation means for generating a pulse signal every predetermined rotational angle at the predetermined axis;

first moving position determination means for determining a moving position of at least one of the workpiece and the tool every predetermined rotational angle;

first movement control means for controlling movement of at least one of the workpiece and the tool in correspondence with the pulse signal generated by said pulse signal generation means so as to set the moving position of at least one of the workpiece and the tool to the moving position determined by said first moving position determination means;

divided-timing signal generation means for generating a divided-timing signal every predetermined time interval;

second moving position determination means for determining the moving position of at least one of the workpiece and the tool every predetermined time interval;

second movement control means for controlling movement of at least one of the workpiece and the tool in correspondence with the divided-timing signal generated by said divided-timing signal generation means so as to set the moving position of at least one of the workpiece and the tool to the moving position determined by said second moving position determination means; and control selection means for selecting one of said first and second movement control means to control movement of at least one of the workpiece and the tool.

2. A machine tool according to claim 1, wherein said control selection means selects one of said first and second movement control means on the basis of a predetermined machining condition of the workpiece.

3. A machine tool according to claim 2, wherein the predetermined machining condition of the workpiece includes thread machining accuracy in thread cutting.

4. A machine tool according to claim 2, wherein said machine tool further comprises counting means for counting the number of times of generation of pulse signals generated by said pulse signal generation means, and said control selection means switches one to the other of said first and second movement control means when the number of times of generation of pulse signals counted by said counting means reaches a predetermined value.

5. A control method for a machine tool for rotating a workpiece about a predetermined axis, and moving at least one of the workpiece and a tool for machining the workpiece, thereby machining the workpiece into a desired shape, the machine tool including:

pulse signal generation means for generating a pulse signal every predetermined rotational angle at the predetermined axis;

first moving position determination means for determining a moving position of at least one of the workpiece and the tool every predetermined rotational angle;

first movement control means for controlling movement of at least one of the workpiece and the tool in correspondence with the pulse signal generated by the pulse signal generation means so as to set the moving position of at least one of the workpiece and the tool to the moving position determined by the first moving position determination means;

divided-timing signal generation means for generating a divided-timing signal every predetermined time interval;

second moving position determination means for determining the moving position of at least one of the workpiece and the tool every predetermined time interval; and second movement control means for controlling movement of at least one of the workpiece and the tool in correspondence with the divided-timing signal generated by the divided-timing signal generation means so as to set the moving position of at least one of the workpiece and the tool to the moving position determined by the second moving position determination means, comprising the steps of:

selecting the first movement control means in machining the workpiece at high machining accuracy, and the second movement control means in machining the workpiece at low machining accuracy; and decreasing a rotational speed of the workpiece about the predetermined axis in machining the workpiece at the high machining accuracy, and increasing the rotational speed of the workpiece about the predetermined axis in machining the workpiece at the low machining accuracy in comparison with machining the workpiece at the high machining accuracy.

6. A machine tool according to claim 1, wherein said machine tool further comprises counting means for counting the number of times of generation of pulse signals generated by said pulse signal generation means, and said control selection means switches one to the other of said first and second movement control means when the number of times of generation of pulse signals counted by said counting means reaches a predetermined value.

* * * * *